United States Patent
Takeda et al.

(10) Patent No.: US 11,452,048 B2
(45) Date of Patent: Sep. 20, 2022

(54) DYNAMIC POWER CONTROL WITH PRIORITY INDICATIONS

(71) Applicant: QUALCOMM Incorporated, San Diego, CA (US)

(72) Inventors: Kazuki Takeda, Tokyo (JP); Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/173,797

(22) Filed: Feb. 11, 2021

(65) Prior Publication Data

US 2021/0258888 A1    Aug. 19, 2021

Related U.S. Application Data

(60) Provisional application No. 62/976,104, filed on Feb. 13, 2020.

(51) Int. Cl.
*H04W 52/28*    (2009.01)
*H04W 52/14*    (2009.01)

(52) U.S. Cl.
CPC ....... *H04W 52/281* (2013.01); *H04W 52/146* (2013.01)

(58) Field of Classification Search
CPC ............. H04W 52/243; H04W 52/146; H04W 52/281; H04W 52/346; H04W 52/44

(Continued)

(56) References Cited

U.S. PATENT DOCUMENTS

| 10,694,470 B2 * | 6/2020 | Yi ........................ H04W 52/146 |
| 2015/0327243 A1 * | 11/2015 | Yin ........................ H04L 5/001 370/329 |

(Continued)

FOREIGN PATENT DOCUMENTS

WO    2015116866 A1    8/2015

OTHER PUBLICATIONS

International Search Report and Written Opinion—PCT/US2021/017929—ISA/EPO—dated May 14, 2021 (202458WO).

*Primary Examiner* — John J Lee
(74) *Attorney, Agent, or Firm* — Harrity & Harrity\Qualcomm

(57) ABSTRACT

Various aspects of the present disclosure generally relate to wireless communication. In some aspects, a user equipment (UE) may identify one or more overlaps between a first set of uplink transmissions on one or more master cell groups (MCGs) and a second set of uplink transmissions on one or more secondary cell groups (SCGs), wherein the first set of uplink transmissions are associated with respective first priority levels and the second set of uplink transmissions are associated with respective second priority levels; determine a power sharing configuration for the first set of uplink transmissions and the second set of uplink transmissions; and drop one or more transmissions, of at least one of the first set of uplink transmissions or the second set of uplink transmissions, based at least in part on the respective first priority levels and the respective second priority levels. Numerous other aspects are provided.

30 Claims, 7 Drawing Sheets

(58) Field of Classification Search
USPC .................. 455/522, 69, 67.11, 422.1, 446
See application file for complete search history.

(56) References Cited

U.S. PATENT DOCUMENTS

2017/0013565 A1\* 1/2017 Pelletier .............. H04W 52/365
2021/0022087 A1\* 1/2021 Saber ................... H04W 52/40

\* cited by examiner

DYNAMIC POWER CONTROL WITH PRIORITY INDICATIONS

CROSS-REFERENCE TO RELATED APPLICATION

This patent application claims priority to U.S. Provisional Patent Application No. 62/976,104 filed on Feb. 13, 2020, entitled "DYNAMIC POWER CONTROL WITH PRIORITY INDICATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamic power control with priority indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include identifying one or more overlaps between a first set of uplink transmissions on one or more master cell groups (MCGs) and a second set of uplink transmissions on one or more secondary cell groups (SCGs), wherein the first set of uplink transmissions are associated with respective first priority levels and the second set of uplink transmissions are associated with respective second priority levels; determining a power sharing configuration for the first set of uplink transmissions and the second set of uplink transmissions based at least in part on identifying the one or more overlaps; and dropping one or more transmissions, of at least one of the first set of uplink transmissions or the second set of uplink transmissions, based at least in part on the respective first priority levels and the respective second priority levels.

In some aspects, a method of wireless communication, performed by a base station, may include scheduling a first set of uplink transmissions on one or more MCGs and a second set of uplink transmissions on one or more SCGs with one or more overlaps, wherein the first set of uplink transmissions are associated with respective first priority levels and the second set of uplink transmissions are associated with respective second priority levels; determining a power sharing configuration for the first set of uplink transmissions and the second set of uplink transmissions based at least in part on the one or more overlaps; and receiving remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels.

In some aspects, a UE for wireless communication may include a memory and one or more processors coupled to the memory. For example, the one or more processors may be operatively, electronically, communicatively, or otherwise coupled to the memory. The memory may include instructions executable by the one or more processors to cause the UE to identify one or more overlaps between a first set of uplink transmissions on one or more MCGs and a second set of uplink transmissions on one or more SCGs, wherein the first set of uplink transmissions are associated with respective first priority levels and the second set of uplink transmissions are associated with respective second priority levels; determine a power sharing configuration for the first set of uplink transmissions and the second set of uplink transmissions based at least in part on identifying the one or more overlaps; and drop one or more transmissions, of at least one of the first set of uplink transmissions or the second set of uplink transmissions, based at least in part on the respective first priority levels and the respective second priority levels.

In some aspects, a base station for wireless communication may include a memory and one or more processors coupled to the memory. For example, the one or more processors may be operatively, electronically, communicatively, or otherwise coupled to the memory. The memory may include instructions executable by the one or more processors to cause the UE to schedule a first set of uplink transmissions on one or more MCGs and a second set of uplink transmissions on one or more SCGs with one or more overlaps, wherein the first set of uplink transmissions are associated with respective first priority levels and the second set of uplink transmissions are associated with respective second priority levels; determine a power sharing configuration for the first set of uplink transmissions and the second set of uplink transmissions based at least in part on the one or more overlaps; and receive remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels.

In some aspects, a non-transitory computer-readable medium may store one or more instructions for wireless communication. The one or more instructions, when executed by one or more processors of a UE, cause the UE to identify one or more overlaps between a first set of uplink transmissions on one or more MCGs and a second set of uplink transmissions on one or more SCGs, wherein the first set of uplink transmissions are associated with respective first priority levels and the second set of uplink transmissions are associated with respective second priority levels; determine a power sharing configuration for the first set of uplink transmissions and the second set of uplink transmissions based at least in part on identifying the one or more overlaps; and drop one or more transmissions, of at least one of the first set of uplink transmissions or the second set of uplink transmissions, based at least in part on the respective first priority levels and the respective second priority levels.

In some aspects, a non-transitory computer-readable medium may store one or more instructions for wireless communication. The one or more instructions, when executed by one or more processors of a base station, cause the base station to schedule a first set of uplink transmissions on one or more MCGs and a second set of uplink transmissions on one or more SCGs with one or more overlaps, wherein the first set of uplink transmissions are associated with respective first priority levels and the second set of uplink transmissions are associated with respective second priority levels; determine a power sharing configuration for the first set of uplink transmissions and the second set of uplink transmissions based at least in part on the one or more overlaps; and receive remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels.

In some aspects, an apparatus for wireless communication may include means for identifying one or more overlaps between a first set of uplink transmissions on one or more MCGs and a second set of uplink transmissions on one or more SCGs, wherein the first set of uplink transmissions are associated with respective first priority levels and the second set of uplink transmissions are associated with respective second priority levels; means for determining a power sharing configuration for the first set of uplink transmissions and the second set of uplink transmissions based at least in part on identifying the one or more overlaps; and means for dropping one or more transmissions, of at least one of the first set of uplink transmissions or the second set of uplink transmissions, based at least in part on the respective first priority levels and the respective second priority levels.

In some aspects, an apparatus for wireless communication may include means for scheduling a first set of uplink transmissions on one or more MCGs and a second set of uplink transmissions on one or more SCGs with one or more overlaps, wherein the first set of uplink transmissions are associated with respective first priority levels and the second set of uplink transmissions are associated with respective second priority levels; means for determining a power sharing configuration for the first set of uplink transmissions and the second set of uplink transmissions based at least in part on the one or more overlaps; and means for receiving remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
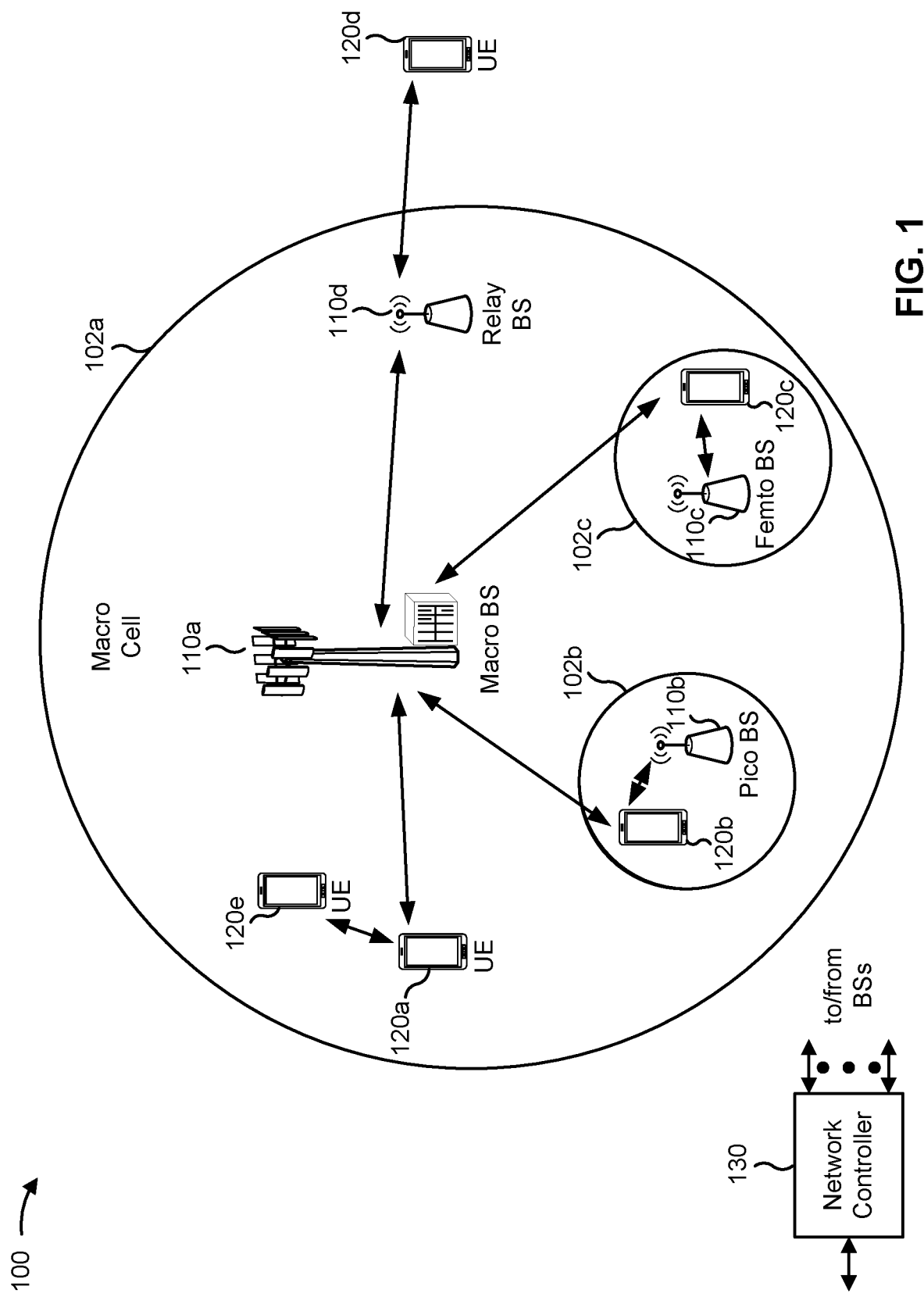
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
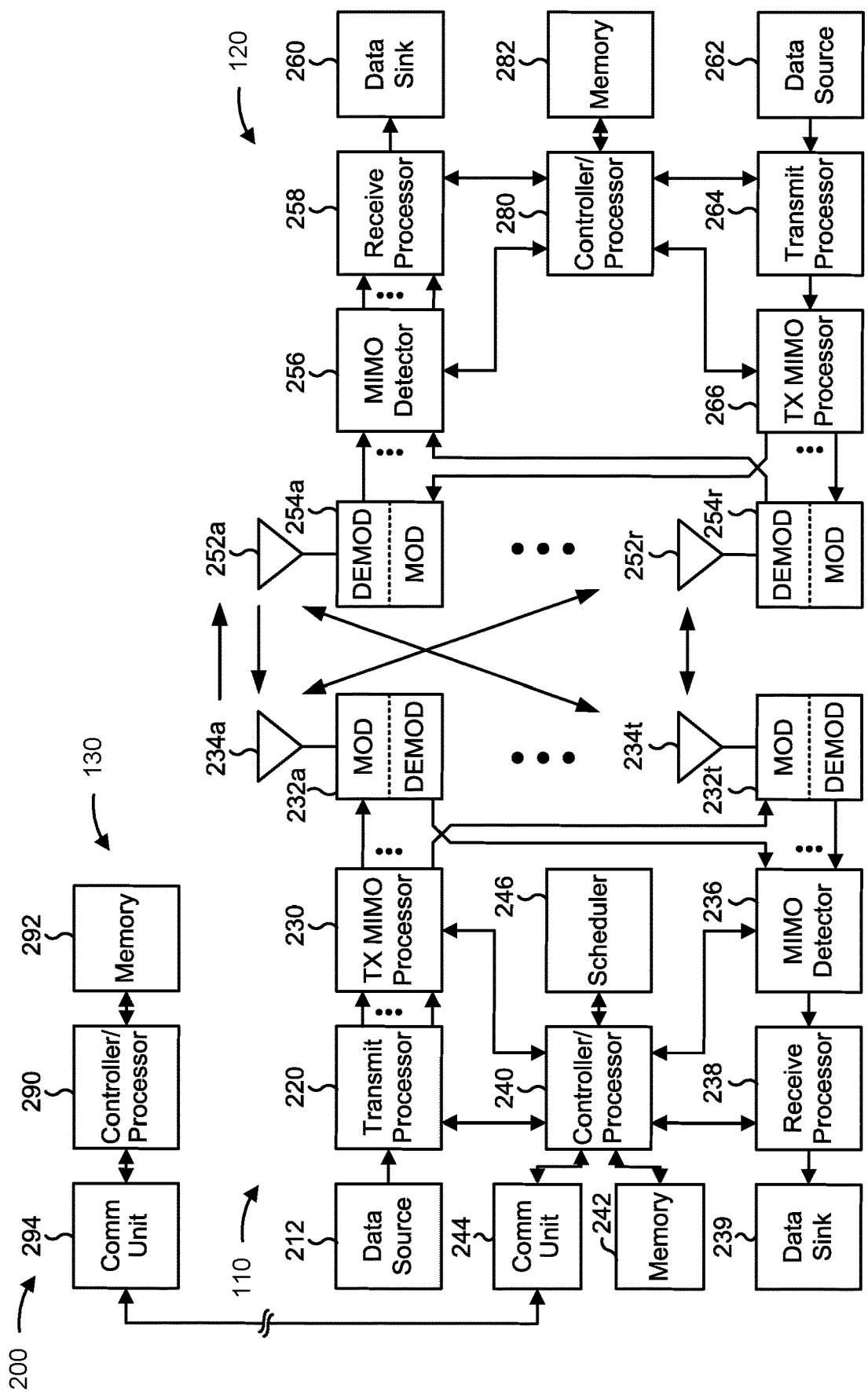
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with dynamic power control with priority indications, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for identifying one or more overlaps between a first set of uplink transmissions on one or more master cell groups (MCGs) and a second set of uplink transmissions on one or more secondary cell groups (SCGs), wherein the first set of uplink transmissions are associated with respective first priority levels and the second set of uplink transmissions are associated with respective second priority levels; means for determining a power sharing configuration for the first set of uplink transmissions and the second set of uplink transmissions based at least in part on identifying the one or more overlaps; means for dropping one or more transmissions, of at least one of the first set of uplink transmissions or the second set of uplink transmissions, based at least in part on the respective first priority levels and the respective second priority levels; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for scheduling a first set of uplink transmissions on one or more MCGs and a second set of uplink transmissions on one or more SCGs with one or more overlaps, wherein the first set of uplink transmissions are associated with respective first priority levels and the second set of uplink transmissions are associated with respective second priority levels; means for determining a power sharing configuration for the first set of uplink transmissions and the second set of uplink transmissions based at least in part on the one or more overlaps; means for receiving remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Dual connectivity (DC) provides a way for a UE to connect to a network (or multiple networks) via multiple cells. A DC configuration may involve a set of master cells, referred to as a master cell group (MCG) and a set of secondary cells, referred to as a secondary cell group (SCG). An MCG may be associated with (e.g., provided by) a master node and an SCG may be associated with a secondary node. A master node may be referred to as an anchor node. The UE may perform initial registration to an anchor node (or an MCG associated with the anchor node). The anchor node may add one or more secondary cells to an SCG of the UE. Thus, the MCG, provided by the master node, may function as the controlling entity, and may utilize an SCG to provide additional data capacity. One type of DC is New Radio Dual Connectivity (NR-DC), in which the MCG and the SCG are both associated with 5G/NR nodes.

Power sharing may be implemented to balance power consumption between an MCG and an SCG. In NR-DC power sharing, transmissions to an MCG may be prioritized over transmissions to an SCG. If transmissions to the MCG and SCG overlap in time and if the summation of transmit powers to the MCG and SCG would exceed the maximum available transmit power for transmissions across the MCG and SCG, a UE may reduce the transmit power to the SCG. To provide sufficient time to adjust the SCG transmit power, the UE may determine a deadline by which overlapping transmissions must be detected. For example, downlink control information (DCI) (or another suitable physical downlink control channel (PDCCH) message) may schedule an uplink transmission (such as in a physical uplink shared channel (PUSCH)) to an SCG at a time T0. Using an offset time (such as T_offset) the UE may determine a deadline of T0-T_offset. If the UE receives DCI before the deadline that schedules an uplink transmission to the MCG that overlaps in time with a scheduled SCG uplink transmission, the UE may reduce the transmit power of the SCG uplink transmission. If the UE receives a DCI after the deadline that schedules an uplink transmission to the MCG that overlaps in time with a scheduled SCG uplink transmission, the UE may not reduce the SCG uplink transmit power. This is because the specification provided by the relevant communication protocol (such as the 5G/NR protocol) ensures that a UE will not receive, from the network after the deadline, DCI scheduling an MCG uplink transmission that will overlap in time with a scheduled SCG uplink transmission.

Some communications or resource allocations may be associated with a priority level. For example, a 3GPP Release 16 specification relating to ultra-reliable low latency communication (URLLC) may introduce a 1-bit priority indication in DL DCI and UL DCI. If multiple transmissions associated with different priority indexes overlap, then the UE may drop a transmission having a lower priority index. The UE may first resolve overlapped physical uplink shared channel (PUSCH) or physical uplink control channel (PUCCH) transmissions with the same priority index across UL carriers (e.g., for each UL carrier, the UE may resolve overlapped communications within that carrier). If two overlapped UL transmissions have different priority levels (referred to generally as a high priority and a low priority), then the UE may apply the following rules:

PUCCH with high priority vs. PUSCH/PUCCH with low priority: drop the PUSCH/PUCCH with low priority;
PUSCH with high priority vs. PUCCH with low priority: drop the PUCCH with low priority;
Dynamic grant (DG) PUSCH with high priority vs. configured grant (CG) PUSCH with low priority: drop the CG-PUSCH with low priority;
CG-PUSCH with high priority vs. DG-PUSCH with low priority: drop the DG-PUSCH with low priority;
CG-PUSCH with high priority vs. CG-PUSCH with low priority: drop the CG-PUSCH with low priority.

Thus, the UE may resolve overlapped transmissions associated with different priority levels.

In some instances, a UE may identify overlapped transmissions in an MCG and/or in an SCG. Furthermore, the UE may determine that a maximum transmit power of the UE would be exceeded when transmitting the overlapped transmissions. In a case where the overlapped transmissions are associated with respective priority levels, it may be unclear how the UE should handle dynamic power sharing with different priority levels. For example, it may be unclear how different combinations of priority levels for different types of communications on an MCG and an SCG should be handled. This ambiguity may lead to underpowered or dropped urgent communications and/or to inefficient allocations of transmit power and/or resources for lower-priority communications.

Some techniques and apparatuses described herein provide power sharing (such as dynamic power sharing) for priority-based communications in an NR-DC configuration. For example, in some aspects, a UE may perform priority handling in an SCG and an MCG (e.g., may drop lower-priority communications in each cell group), and then may determine a power sharing configuration for remaining communications in the SCG and the MCG. In some aspects, the UE may determine respective power sharing configurations for groups of transmissions associated with each priority level, and then may drop a lower-priority group of transmissions. In this way, the UE may determine a power sharing configuration (e.g., for dynamic spectrum sharing) for a plurality of communications associated with respective priority levels. Thus, higher-priority traffic may be prioritized for transmission and/or transmit power, thereby improving likelihood that the higher-priority traffic is received, particularly on the MCG. Furthermore, these approaches for power sharing configurations may reduce ambiguity in the operation of the network, thereby conserving computing resources that would otherwise be used to repeatedly transmit a failed communication due to improper power sharing.

Figure 3:
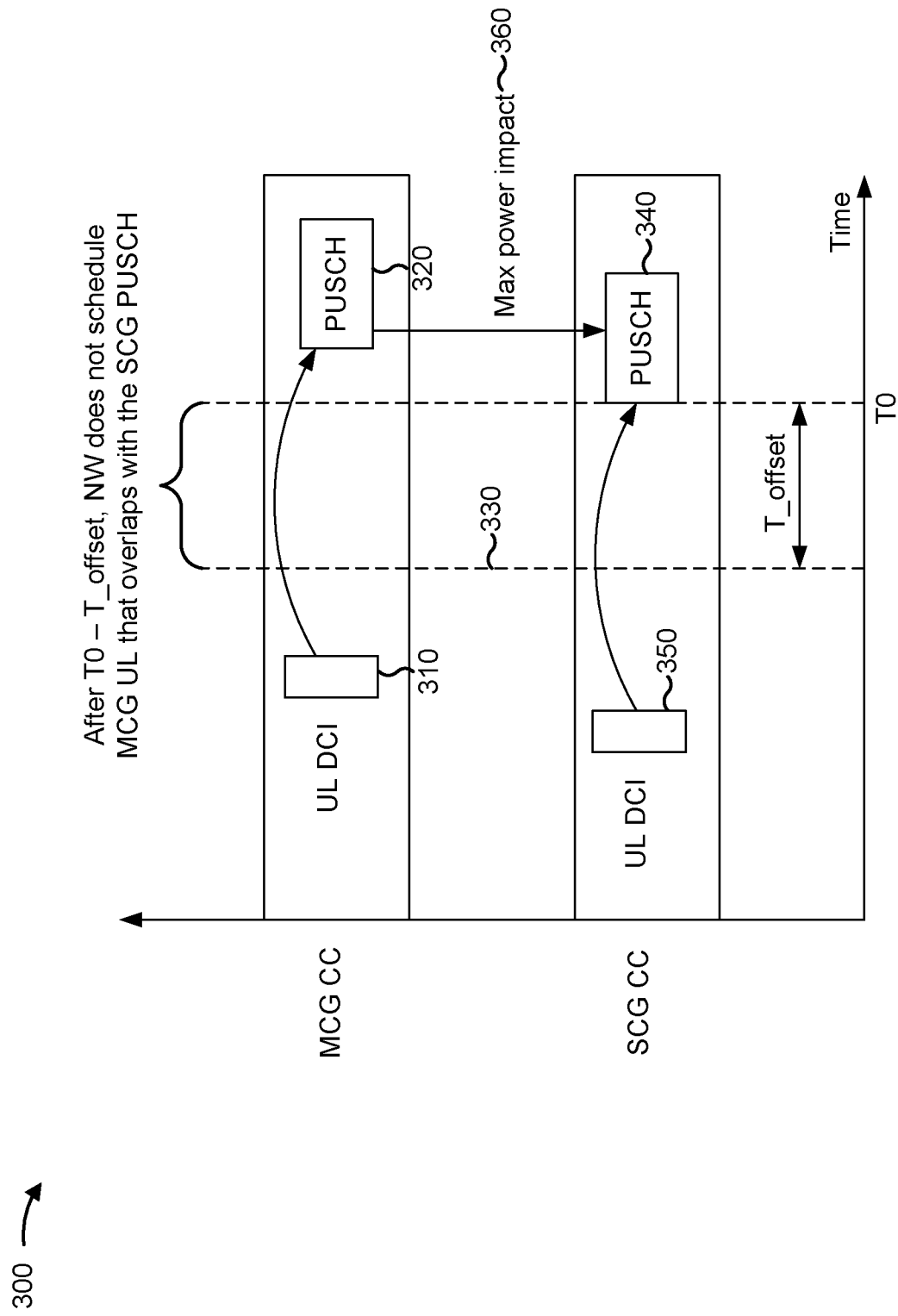
FIG. 3 is a diagram illustrating an example of transmission of a first transmission on a master cell group (MCG) and a second transmission on a secondary cell group (SCG), in accordance with the present disclosure.

FIG. 3 is a diagram illustrating an example 300 of transmission of a first transmission on an MCG and a second transmission on an SCG, in accordance with the present disclosure. Example 300 shows an MCG component carrier (CC) and an SCG CC. The operations shown in example 300 may be performed by a UE (e.g., UE 120). A CC may correspond to a serving cell, such as a cell of an MCG or an SCG.

As shown, the UE may receive, on the MCG CC, UL DCI 310. For example, the UL DCI 310 may schedule a PUSCH 320 on the MCG CC. In this case, the PUSCH may be referred to as a dynamic grant (DG) PUSCH. As further shown, the UE may receive the UL DCI 310 before a deadline 330. For example, the deadline 330 may be defined by T0-T_offset, where T0 is a start of an uplink transmission 340 and T_offset is an offset time relative to T0. The uplink transmission 340 may be scheduled by UL DCI 350. The UE may not expect UL DCI scheduling a PUSCH on the MCG that overlaps with a PUSCH on the SCG after the deadline 330, since, in such a case, the UE may have difficulty performing power management for the MCG and the SCG.

When the UE performs dynamic power sharing for the MCG and the SCG, the MCG's transmit power may impact the SCG's transmit power, as shown by reference number 360. For example, for transmit power determination of the PUSCH 320, the UE may not be required to take into account a transmit power of the SCG. This may be referred to as a 3GPP Release 15 carrier aggregation power allocation procedure within the MCG. For transmit power determination of the uplink transmission 340, the UE may take into account an overlapping MCG uplink transmission (e.g., the PUSCH 320) that was scheduled before the deadline 330. For example, the UE may determine the maximum transmit power of the SCG as $\min\{P_{SCG}, P_{total}-\text{MCG tx power}\}$, wherein $P_{SCG}$ is a baseline transmit power of the uplink transmission 340, $P_{total}$ is a maximum UE transmit power, and MCG tx power is a transmit power of the PUSCH 320. For an SCG transmission starting at time T0, the network may not schedule an overlapping MCG uplink transmission after T0-T_offset.

In some aspects, the DCI 310 and/or the DCI 350 may indicate a priority level. For example, the DCI 310 may indicate a priority level of the PUSCH 320 and/or the DCI 350 may indicate a priority level of the uplink transmission 340. In this case, the UE may first resolve overlapped PUSCH/PUCCH transmissions with a same priority level across carriers using a 3GPP Release 15 approach, and may next resolve overlapped PUSCH/PUCCH transmissions associated with different priority levels using the techniques described above.

As indicated above, FIG. 3 is provided as an example. Other examples may differ from what is described with respect to FIG. 3.

Figure 4:
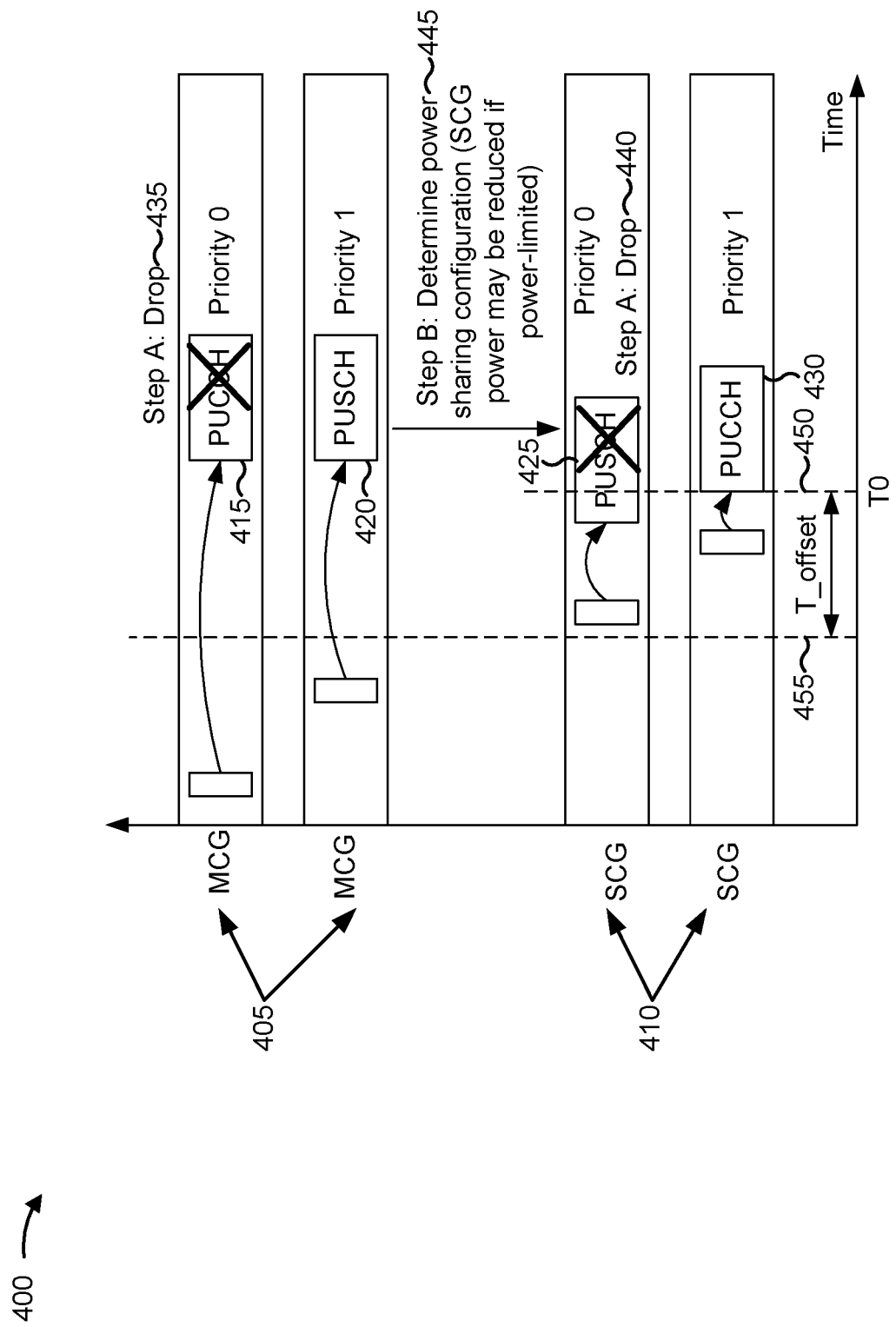
FIG. 4 is a diagram illustrating an example of determination of a power control configuration for overlapped uplink transmissions on an MCG and an SCG, in accordance with the present disclosure.

FIG. 4 is a diagram illustrating an example 400 of determination of a power control configuration for overlapped uplink transmissions on an MCG and an SCG, in accordance with the present disclosure. Example 400 is an example where priority handling is performed first within each cell group (described as Step A) and dynamic power sharing is performed after priority handling (described as Step B). The operations described in connection with FIG. 4 may be performed by a UE (e.g., UE 120).

Example 400 shows an MCG 405 and an SCG 410. The MCG 405 and the SCG 410 are shown in two rows to illustrate overlapped communications on the MCG 405 and the SCG 410. As shown, the MCG is associated with a first uplink transmission 415 (e.g., a PUCCH) that overlaps a second uplink transmission 420 (e.g., a PUSCH). The first uplink transmission 415 is associated with a first priority level (e.g., a priority 0, which is a lower priority level in example 400) and the second uplink transmission 420 is associated with a second priority level (e.g., a priority 1, which is a higher priority level in example 400). As further shown, the SCG is associated with a third uplink transmission 425 (e.g., a PUSCH) with the lower priority level that overlaps a fourth uplink transmission 430 (e.g., a PUCCH) with the higher priority level. Furthermore, the uplink transmissions 415, 420, 425, and 430 all at least partially overlap each other.

As shown in FIG. 4, and by reference numbers 435 and 440, the UE may first drop one or more overlapped communications on each cell group based at least in part on respective priority levels of the overlapped communications (e.g., in Step A). For example, as shown by reference number 435, the UE may drop the first uplink transmission 415 based at least in part on the first uplink transmission 415 being associated with a lower priority level than the second uplink transmission 420. As another example, as shown by reference number 440, the UE may drop the third uplink transmission 425 based at least in part on the third uplink transmission 425 being associated with a lower priority level than the fourth uplink transmission 430. Thus, the UE may determine a set of remaining transmissions (e.g., the second uplink transmission 420 and the fourth uplink transmission 430).

As shown by reference number 445, the UE may determine a power sharing configuration for the set of remaining transmissions. A power sharing configuration indicates respective transmit powers for one or more communications on the MCG and one or more communications on the SCG. A UE transmitting a communication in accordance with a power sharing configuration may transmit the communication using a transmit power indicated by the power sharing configuration. For example, if the UE is power limited (e.g., if a sum of transmit powers of the set of remaining transmissions exceeds a maximum UE transmit power of the UE), then the UE may reduce a transmit power on the SCG so that the sum of the transmit powers does not exceed the maximum UE transmit power. In some aspects, the UE may not modify the MCG's uplink transmission power, which improves uplink performance on the MCG.

In some cases, based at least in part on the dropping of the one or more overlapped communications on each cell group based at least in part on the respective priority levels, and the determination of the power sharing configuration for the set of remaining transmissions, the UE 120 may prioritize a lower-priority transmission on the MCG over a higher-priority transmission on the SCG. For example, if the first uplink transmission 415 had a priority level of 0, the second uplink transmission 420 had a priority level of 1, the third uplink transmission 425 had a priority level of 2, and the fourth uplink transmission 430 had a priority level of 3 (so the third uplink transmission 425 and the fourth uplink 430 have higher priority levels than the first uplink transmission 415 and the second uplink transmission 420), then the UE 120 may drop the first uplink transmission 415 and the third uplink transmission 525. Then, the UE 120 may determine a power sharing configuration that limits (e.g., reduces) the transmit power of the SCG if the UE 120 is power limited, irrespective of the fourth uplink transmission 430 being associated with a higher priority level than the second uplink transmission 420. Thus, transmissions on the MCG are prioritized over transmissions on the SCG irrespective of relative priority levels of the transmissions, thereby improving reliability of MCG signaling and reducing the incidence of radio link failure due to failure to communicate control information.

As shown by reference number 450, T0 (and thus the deadline 455) may be measured relative to a remaining uplink transmission of the SCG (e.g., the fourth uplink transmission 430). Thus, the UE may consider only MCG transmissions that are scheduled by UL DCI received before the deadline 455 as valid. Here, both transmissions on the MCG are scheduled by UL DCI received before the deadline 455, so both transmissions on the MCG are considered valid.

As indicated above, FIG. 4 is provided as an example. Other examples may differ from what is described with respect to FIG. 4.

Figure 5:
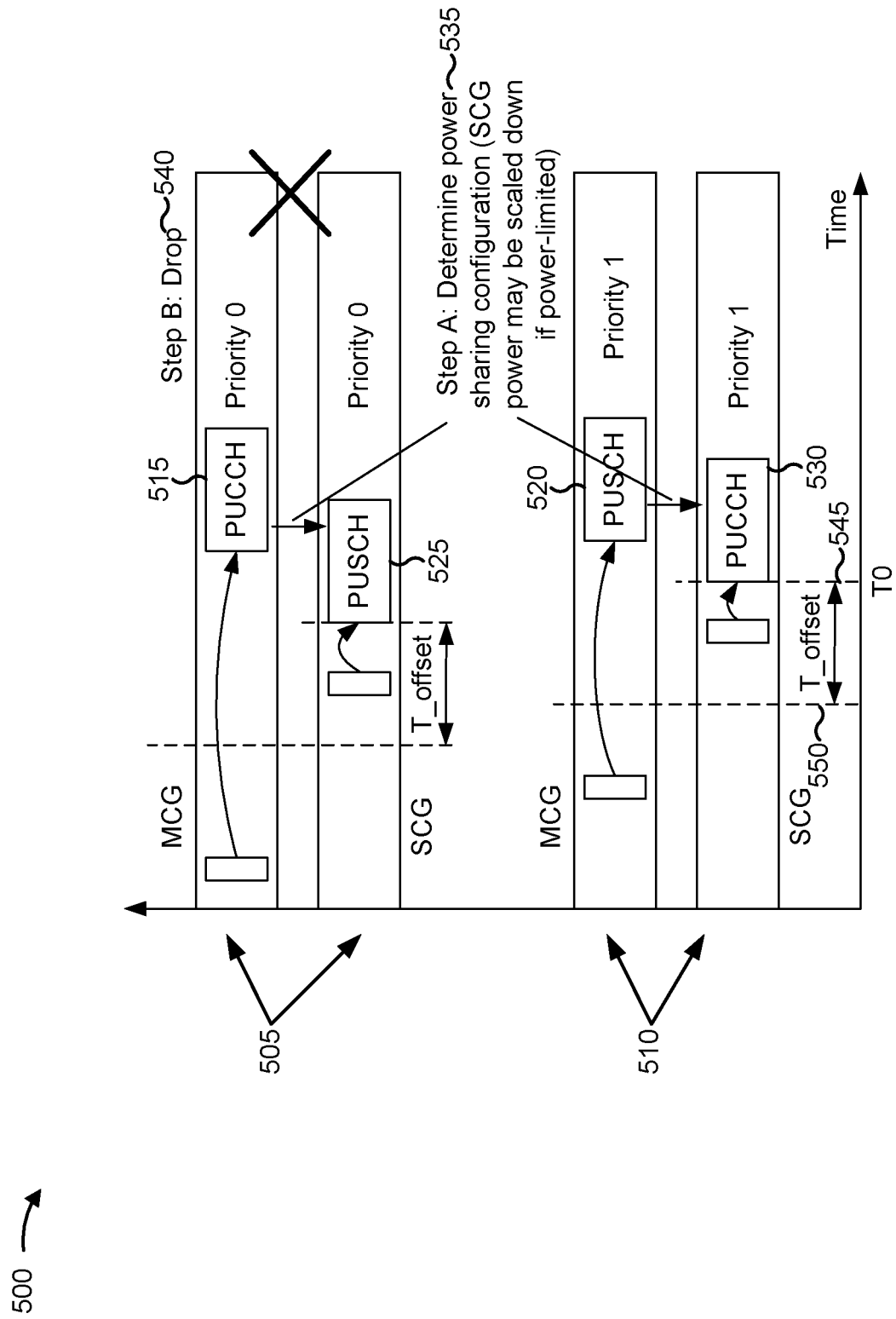
FIG. 5 is a diagram illustrating an example of determination of a power control configuration for overlapped uplink transmissions on an MCG and an SCG, in accordance with the present disclosure.

FIG. 5 is a diagram illustrating an example 500 of determination of a power control configuration for overlapped uplink transmissions on an MCG and an SCG, in accordance with the present disclosure. Example 500 is an example where dynamic power sharing is performed first within each priority group (described as Step A) and priority-based dropping uplink transmissions is performed after dynamic power sharing (described as Step B). The operations described in connection with FIG. 5 may be performed by a UE (e.g., UE 120).

Example 500 shows a first priority group 505 and a second priority group 510. The first priority group is associated with a priority level of 0 (e.g., a lower priority level) and the second priority group is associated with a priority level of 1 (e.g. a higher priority level). A first uplink transmission 515 on an MCG is associated with the first priority group 505, and a second uplink transmission 520 on the MCG is associated with the second priority group 510. Furthermore, a third uplink transmission 525 on an SCG is associated with the first priority group 505, and a fourth uplink transmission 530 on the SCG is associated with the second priority group 510. The MCG and the SCG are shown in two rows to illustrate overlapped communications on the MCG and the SCG, such as overlapped communications within a priority group.

As shown by reference numbers 535, the UE may first determine respective power sharing configurations for the uplink transmissions of the priority groups 505 and 510 (e.g., in Step A). For example, the UE may determine transmit powers for the uplink transmissions 525 and 530 based at least in part in the uplink transmissions 525 and 530 overlapping the uplink transmissions 515 and 520 on the MCG.

As shown by reference number 540, the UE may drop one or more transmissions associated with the priority group 505 (e.g., the lower-priority group). For example, the UE may drop the first uplink transmission 515 based at least in part on the first uplink transmission 515 having a lower priority level than the second uplink transmission 520, and may drop the third uplink transmission 525 based at least in part on the third uplink transmission 525 having a lower priority level than the fourth uplink transmission 530. The UE may transmit the second uplink transmission 520 and the fourth uplink transmission 530 in accordance with the power sharing configuration determined for the priority group 510.

As shown by reference number 545, T0 (and thus the deadline 550) may be measured relative to a remaining uplink transmission of the SCG (e.g., the fourth uplink transmission 530). Thus, the UE may consider only MCG transmissions that are scheduled by UL DCI received before the deadline 550 as valid. Here, both transmissions on the MCG are scheduled by UL DCI received before the deadline 550, so both transmissions on the MCG are considered valid.

As indicated above, FIG. 5 is provided as an example. Other examples may differ from what is described with respect to FIG. 5.

Figure 6:
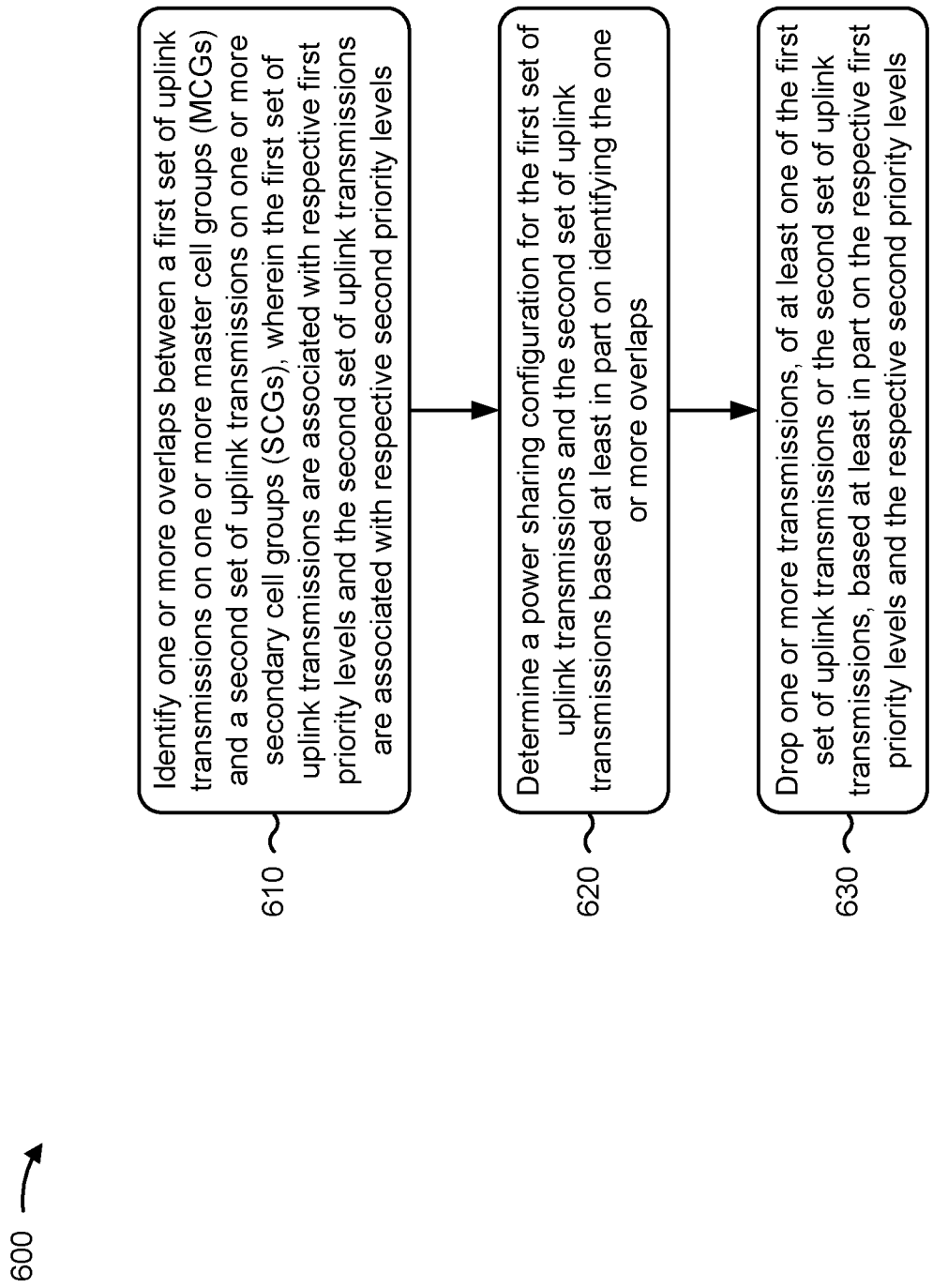
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with dynamic power control with priority indications.

As shown in FIG. 6, in some aspects, process 600 may include identifying one or more overlaps between a first set of uplink transmissions on one or more MCGs and a second set of uplink transmissions on one or more SCGs, wherein the first set of uplink transmissions are associated with respective first priority levels and the second set of uplink transmissions are associated with respective second priority levels (block 610). For example, the UE (e.g., using controller/processor 280, transmit processor 264, TX MIMO processor 266, MOD 254, antenna 252, and/or the like) may identify one or more overlaps between a first set of uplink transmissions on one or more MCGs and a second set of uplink transmissions on one or more SCGs, as described above. In some aspects, the first set of uplink transmissions are associated with respective first priority levels and the second set of uplink transmissions are associated with respective second priority levels.

As further shown in FIG. 6, in some aspects, process 600 may include determining a power sharing configuration for the first set of uplink transmissions and the second set of uplink transmissions based at least in part on identifying the one or more overlaps (block 620). For example, the UE (e.g., using controller/processor 280, transmit processor 264, TX MIMO processor 266, MOD 254, antenna 252, and/or the like) may determine a power sharing configuration for the first set of uplink transmissions and the second set of uplink transmissions based at least in part on identifying the one or more overlaps, as described above.

As further shown in FIG. 6, in some aspects, process 600 may include dropping one or more transmissions, of at least one of the first set of uplink transmissions or the second set of uplink transmissions, based at least in part on the respective first priority levels and the respective second priority levels (block 630). For example, the UE (e.g., using controller/processor 280, transmit processor 264, TX MIMO processor 266, MOD 254, antenna 252, and/or the like) may drop one or more transmissions, of at least one of the first set of uplink transmissions or the second set of uplink transmissions, based at least in part on the respective first priority levels and the respective second priority levels, as described above.

Process 600 may include additional aspects, such as any single aspect or any combination of aspects described below and/or in connection with one or more other processes described elsewhere herein.

In a first aspect, dropping the one or more transmissions comprises dropping a transmission from the first set of uplink transmissions and dropping a transmission from the second set of uplink transmissions, and determining the power sharing configuration is based at least in part on remaining transmissions of the first set of uplink transmissions and the second set of uplink transmissions.

In a second aspect, alone or in combination with the first aspect, determining the power sharing configuration comprises determining a decreased transmit power of a remaining transmission of the second set of uplink transmissions based at least in part on a sum of transmit powers of the remaining transmissions of the first set of uplink transmissions and the second set of uplink transmissions satisfying a threshold.

In a third aspect, alone or in combination with one or more of the first and second aspects, the remaining transmission of the second set of uplink transmissions is associated with a higher priority level than a remaining transmission of the first set of uplink transmissions.

In a fourth aspect, alone or in combination with one or more of the first and third aspects, the power sharing configuration indicates that a transmit power of a remaining transmission of the first set of uplink transmissions is not impacted by a transmit power of a remaining transmission of the second set of uplink transmissions.

In a fifth aspect, alone or in combination with one or more of the first through fourth aspects, the threshold relates to a maximum UE transmit power.

In a sixth aspect, alone or in combination with one or more of the first through fifth aspects, the dropped transmission from the first set of uplink transmissions and the dropped transmission from the second set of uplink transmissions are associated with lower priority levels than priority levels associated with remaining transmissions of the first set of uplink transmissions and the second set of uplink transmissions.

In a seventh aspect, alone or in combination with one or more of the first through sixth aspects, a deadline for scheduling a transmission on the one or more MCGs is determined based at least in part on a start of a remaining transmission of the second set of uplink transmissions.

In an eighth aspect, alone or in combination with one or more of the first through seventh aspects, dropping the one or more transmissions is performed before determining the power sharing configuration.

In a ninth aspect, alone or in combination with one or more of the first through eighth aspects, determining the power sharing configuration is performed before dropping the one or more transmissions.

In a tenth aspect, alone or in combination with one or more of the first through ninth aspects, determining the power sharing configuration further comprises decreasing respective transmit powers of the second set of uplink transmissions based at least in part on a sum of transmit powers of overlapped transmissions, of the first set of uplink transmissions and the second set of uplink transmissions, satisfying a threshold.

In an eleventh aspect, alone or in combination with one or more of the first through tenth aspects, the lower-priority group of transmissions includes a transmission of the first set of uplink transmissions and a transmission of the second set of uplink transmissions.

In a twelfth aspect, alone or in combination with one or more of the first through eleventh aspects, the lower-priority group of transmissions are associated with lower priority levels than priority levels associated with remaining transmissions of the first set of uplink transmissions and the second set of uplink transmissions.

In a thirteenth aspect, alone or in combination with one or more of the first through twelfth aspects, for a given priority level, a deadline for scheduling a transmission on the one or more MCGs is determined based at least in part on a start of a transmission of the second set of uplink transmissions associated with the given priority level.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
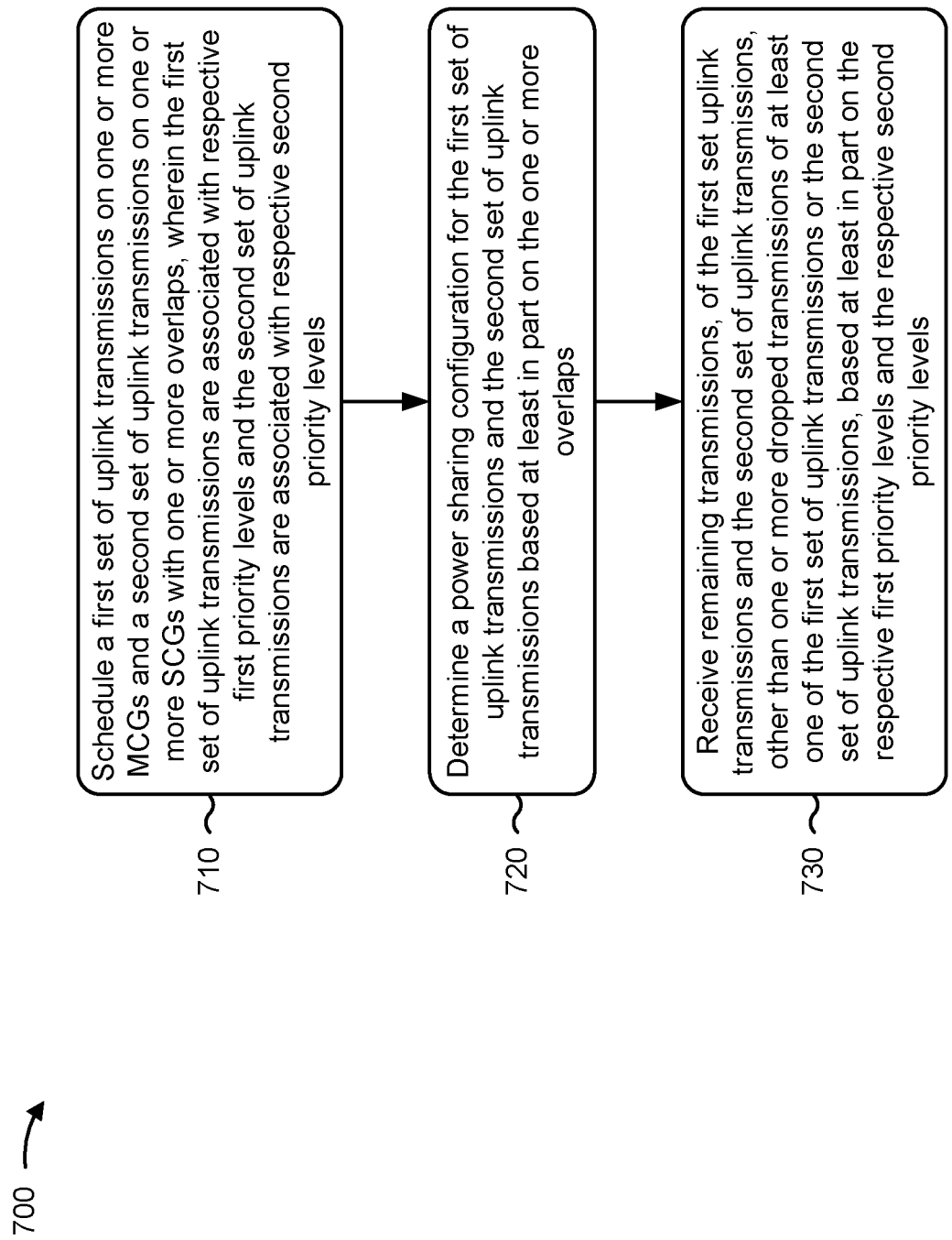
FIG. 7 is a diagram illustrating an example process performed, for example, by a base station in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with dynamic power control with priority indications.

As shown in FIG. 7, in some aspects, process 700 may include scheduling a first set of uplink transmissions on one or more MCGs and a second set of uplink transmissions on one or more SCGs with one or more overlaps, wherein the first set of uplink transmissions are associated with respective first priority levels and the second set of uplink transmissions are associated with respective second priority levels (block 710). For example, the base station (e.g., using controller/processor 240, transmit processor 220, TX MIMO processor 230, MOD 232, antenna 234, and/or the like) may schedule a first set of uplink transmissions on one or more MCGs and a second set of uplink transmissions on one or more SCGs with one or more overlaps, as described above. In some aspects, the first set of uplink transmissions are associated with respective first priority levels and the second set of uplink transmissions are associated with respective second priority levels.

As further shown in FIG. 7, in some aspects, process 700 may include determining a power sharing configuration for the first set of uplink transmissions and the second set of uplink transmissions based at least in part on the one or more overlaps (block 720). For example, the base station (e.g., using controller/processor 240, transmit processor 220, TX MIMO processor 230, MOD 232, antenna 234, and/or the like) may determine a power sharing configuration for the first set of uplink transmissions and the second set of uplink transmissions based at least in part on the one or more overlaps, as described above.

As further shown in FIG. 7, in some aspects, process 700 may include receiving remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels (block 730). For example, the base station (e.g., using antenna 234, DEMOD 232, MIMO detector 236, receive processor 238, controller/processor 240, and/or the like) may receive remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels, as described above.

Process 700 may include additional aspects, such as any single aspect or any combination of aspects described below and/or in connection with one or more other processes described elsewhere herein.

In a first aspect, a transmission from the first set of uplink transmissions and a transmission from the second set of uplink transmissions are dropped, and determining the power sharing configuration is based at least in part on the remaining transmissions.

In a second aspect, alone or in combination with the first aspect, determining the power sharing configuration comprises determining a decreased transmit power of a remaining transmission of the second set of uplink transmissions based at least in part on a sum of transmit powers of the remaining transmissions satisfying a threshold.

In a third aspect, alone or in combination with one or more of the first and second aspects, the power sharing configuration indicates that a transmit power of a remaining transmission of the first set of uplink transmissions is not diminished.

In a fourth aspect, alone or in combination with one or more of the first through third aspects, the threshold relates to a maximum user equipment transmit power.

In a fifth aspect, alone or in combination with one or more of the first through fourth aspects, the dropped transmission from the first set of uplink transmissions and the dropped transmission from the second set of uplink transmissions are associated with lower priority levels than priority levels associated with remaining transmissions of the first set of uplink transmissions and the second set of uplink transmissions.

In a sixth aspect, alone or in combination with one or more of the first through fifth aspects, a deadline for scheduling a transmission on the one or more MCGs is determined based at least in part on a start of a remaining transmission of the second set of uplink transmissions.

In a seventh aspect, alone or in combination with one or more of the first through sixth aspects, determining the power sharing configuration further comprises decreasing respective transmit powers of the second set of uplink transmissions based at least in part on a sum of transmit powers of overlapped transmissions, of the first set of uplink transmissions and the second set of uplink transmissions, satisfying a threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some aspects of the present disclosure:

Aspect 1: A method of wireless communication performed by a user equipment (UE), comprising: identifying one or more overlaps between a first set of uplink transmissions on one or more master cell groups (MCGs) and a second set of uplink transmissions on one or more secondary cell groups (SCGs), wherein the first set of uplink transmissions are associated with respective first priority levels and the second set of uplink transmissions are associated with respective second priority levels; determining a power sharing configuration for the first set of uplink transmissions and the second set of uplink transmissions based at least in part on identifying the one or more overlaps; and dropping one or more transmissions, of at least one of the first set of uplink transmissions or the second set of uplink transmissions, based at least in part on the respective first priority levels and the respective second priority levels.

Aspect 2: The method of aspect 1, wherein dropping the one or more transmissions comprises dropping a transmission from the first set of uplink transmissions and dropping a transmission from the second set of uplink transmissions, and wherein determining the power sharing configuration is based at least in part on remaining transmissions of the first set of uplink transmissions and the second set of uplink transmissions.

Aspect 3: The method of aspect 2, wherein determining the power sharing configuration comprises determining a decreased transmit power of a remaining transmission of the second set of uplink transmissions based at least in part on a sum of transmit powers of the remaining transmissions of the first set of uplink transmissions and the second set of uplink transmissions satisfying a threshold.

Aspect 4: The method of aspect 3, wherein the remaining transmission of the second set of uplink transmissions is associated with a higher priority level than a remaining transmission of the first set of uplink transmissions.

Aspect 5: The method of aspect 3, wherein the power sharing configuration indicates that a transmit power of a remaining transmission of the first set of uplink transmissions is not impacted by a transmit power of a remaining transmission of the second set of uplink transmissions.

Aspect 6: The method of aspect 3, wherein the threshold relates to a maximum UE transmit power.

Aspect 7: The method of aspect 2, wherein the dropped transmission from the first set of uplink transmissions and the dropped transmission from the second set of uplink transmissions are associated with lower priority levels than priority levels associated with remaining transmissions of the first set of uplink transmissions and the second set of uplink transmissions.

Aspect 8: The method of aspect 2, wherein a deadline for scheduling a transmission on the one or more MCGs is determined based at least in part on a start of a remaining transmission of the second set of uplink transmissions.

Aspect 9: The method of any of aspects 1-8, wherein dropping the one or more transmissions is performed before determining the power sharing configuration.

Aspect 10: The method of any of aspects 1-8, wherein determining the power sharing configuration is performed before dropping the one or more transmissions.

Aspect 11: The method of any of aspects 1-10, wherein determining the power sharing configuration further comprises decreasing respective transmit powers of the second set of uplink transmissions based at least in part on a sum of transmit powers of overlapped transmissions, of the first set of uplink transmissions and the second set of uplink transmissions, satisfying a threshold.

Aspect 12: The method of aspect 11, further comprising dropping a lower-priority group of transmissions, of the first set of uplink transmissions and the second set of uplink transmissions, wherein the lower-priority group of transmissions includes a transmission of the first set of uplink transmissions and a transmission of the second set of uplink transmissions.

Aspect 13: The method of aspect 12, wherein the lower-priority group of transmissions are associated with lower priority levels than priority levels associated with remaining transmissions of the first set of uplink transmissions and the second set of uplink transmissions.

Aspect 14: The method of aspect 11, wherein, for a given priority level, a deadline for scheduling a transmission on the one or more MCGs is determined based at least in part on a start of a transmission of the second set of uplink transmissions associated with the given priority level.

Aspect 15: A method of wireless communication performed by a base station, comprising: scheduling a first set of uplink transmissions on one or more master cell groups (MCGs) and a second set of uplink transmissions on one or more secondary cell groups (SCGs) with one or more overlaps, wherein the first set of uplink transmissions are associated with respective first priority levels and the second set of uplink transmissions are associated with respective second priority levels; determining a power sharing configuration for the first set of uplink transmissions and the second set of uplink transmissions based at least in part on the one or more overlaps; and receiving remaining transmissions, of the first set of uplink transmissions and the second set of uplink transmissions, other than one or more dropped transmissions of at least one of the first set of uplink transmissions or the second set of uplink transmissions, based at least in part on the respective first priority levels and the respective second priority levels.

Aspect 16: The method of aspect 15, wherein a transmission from the first set of uplink transmissions and a transmission from the second set of uplink transmissions are dropped, and wherein determining the power sharing configuration is based at least in part on the remaining transmissions.

Aspect 17: The method of aspect 16, wherein determining the power sharing configuration comprises determining a decreased transmit power of a remaining transmission of the second set of uplink transmissions based at least in part on a sum of transmit powers of the remaining transmissions satisfying a threshold.

Aspect 18: The method of aspect 17, wherein the power sharing configuration indicates that a transmit power of a remaining transmission of the first set of uplink transmissions is not diminished.

Aspect 19: The method of aspect 17, wherein the threshold relates to a maximum user equipment transmit power.

Aspect 20: The method of aspect 16, wherein the dropped transmission from the first set of uplink transmissions and the dropped transmission from the second set of uplink transmissions are associated with lower priority levels than priority levels associated with remaining transmissions of the first set of uplink transmissions and the second set of uplink transmissions.

Aspect 21: The method of aspect 16, wherein a deadline for scheduling a transmission on the one or more MCGs is determined based at least in part on a start of a remaining transmission of the second set of uplink transmissions.

Aspect 22: The method of any of aspects 15-21, wherein determining the power sharing configuration further comprises decreasing respective transmit powers of the second set of uplink transmissions based at least in part on a sum of transmit powers of overlapped transmissions, of the first set of uplink transmissions and the second set of uplink transmissions, satisfying a threshold.

Aspect 23: The method of any of aspects 15-22, further comprising determining that a lower-priority group of transmissions, of the first set of uplink transmissions and the second set of uplink transmissions, is dropped, wherein the lower-priority group of transmissions includes a transmission of the first set of uplink transmissions and a transmission of the second set of uplink transmissions.

Aspect 24: The method of aspect 23, wherein the lower-priority group of transmissions are associated with lower priority levels than priority levels associated with remaining transmissions of the first set of uplink transmissions and the second set of uplink transmissions.

Aspect 25: The method of aspect 24, wherein, for a given priority level, a deadline for scheduling a transmission on the one or more MCGs is determined based at least in part on a start of a transmission of the second set of uplink transmissions associated with the given priority level.

Aspect 26: An apparatus for wireless communication at a device, comprising a processor; memory coupled with the processor; and instructions stored in the memory and executable by the processor to cause the apparatus to perform the method of one or more aspects of aspects 1-25.

Aspect 27: A device for wireless communication, comprising a memory and one or more processors coupled to the memory, the memory and the one or more processors configured to perform the method of one or more aspects of aspects 1-25.

Aspect 28: An apparatus for wireless communication, comprising at least one means for performing the method of one or more aspects of aspects 1-25.

Aspect 29: A non-transitory computer-readable medium storing code for wireless communication, the code comprising instructions executable by a processor to perform the method of one or more aspects of aspects 1-25.

Aspect 30: A non-transitory computer-readable medium storing a set of instructions for wireless communication, the set of instructions comprising one or more instructions that, when executed by one or more processors of a device, cause the device to perform the method of one or more aspects of aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    identifying one or more overlaps between a first set of uplink transmissions on one or more master cell groups (MCGs) and a second set of uplink transmissions on one or more secondary cell groups (SCGs), wherein the first set of uplink transmissions are associated with respective first priority levels and the second set of uplink transmissions are associated with respective second priority levels;
    dropping one or more transmissions, of at least one of the first set of uplink transmissions or the second set of uplink transmissions, based at least in part on the respective first priority levels and the respective second priority levels; and
    determining a power sharing configuration for one or more remaining transmissions of the at least one of the first set of uplink transmissions or the second set of uplink transmissions based at least in part on dropping the one or more transmissions of the at least one of the first set of uplink transmissions or the second set of uplink transmissions.

2. The method of claim 1, wherein dropping the one or more transmissions comprises dropping a transmission from the first set of uplink transmissions and dropping a transmission from the second set of uplink transmissions.

3. The method of claim 2, wherein determining the power sharing configuration comprises determining a decreased transmit power of a remaining transmission of the second set of uplink transmissions based at least in part on a sum of transmit powers of the remaining transmissions of the first set of uplink transmissions and the second set of uplink transmissions satisfying a threshold.

4. The method of claim 3, wherein the remaining transmission of the second set of uplink transmissions is associated with a higher priority level than a remaining transmission of the first set of uplink transmissions.

5. The method of claim 3, wherein the power sharing configuration indicates that a transmit power of a remaining transmission of the first set of uplink transmissions is not impacted by a transmit power of a remaining transmission of the second set of uplink transmissions.

6. The method of claim 3, wherein the threshold relates to a maximum UE transmit power.

7. The method of claim 2, wherein the dropped transmission from the first set of uplink transmissions and the dropped transmission from the second set of uplink transmissions are associated with lower priority levels than priority levels associated with remaining transmissions of the first set of uplink transmissions and the second set of uplink transmissions.

8. The method of claim 2, wherein a deadline for scheduling a transmission on the one or more MCGs is determined based at least in part on a start of a remaining transmission of the second set of uplink transmissions.

9. The method of claim 1, wherein determining the power sharing configuration further comprises decreasing respective transmit powers of the second set of uplink transmissions based at least in part on a sum of transmit powers of overlapped transmissions, of the first set of uplink transmissions and the second set of uplink transmissions, satisfying a threshold.

10. The method of claim 9, further comprising dropping a lower-priority group of transmissions, of the first set of uplink transmissions and the second set of uplink transmissions, wherein the lower-priority group of transmissions includes a transmission of the first set of uplink transmissions and a transmission of the second set of uplink transmissions.

11. The method of claim 10, wherein the lower-priority group of transmissions are associated with lower priority levels than priority levels associated with remaining transmissions of the first set of uplink transmissions and the second set of uplink transmissions.

12. The method of claim 9, wherein, for a given priority level, a deadline for scheduling a transmission on the one or more MCGs is determined based at least in part on a start of a transmission of the second set of uplink transmissions associated with the given priority level.

13. A method of wireless communication performed by a base station, comprising:
    scheduling a first set of uplink transmissions on one or more master cell groups (MCGs) and a second set of uplink transmissions on one or more secondary cell groups (SCGs) with one or more overlaps, wherein the first set of uplink transmissions are associated with respective first priority levels and the second set of uplink transmissions are associated with respective second priority levels;
    receiving one or more remaining transmissions, of at least one of the first set of uplink transmissions or the second set of uplink transmissions, other than one or more dropped transmissions of the at least one of the first set of uplink transmissions or the second set of uplink transmissions, based at least in part on the respective first priority levels, the respective second priority levels, and a power sharing configuration for the one or more remaining transmissions; and
    determining the power sharing configuration for the one or more remaining transmissions based at least in part on the one or more overlaps.

14. The method of claim 13, wherein a transmission from the first set of uplink transmissions and a transmission from the second set of uplink transmissions are dropped.

15. The method of claim 14, wherein determining the power sharing configuration comprises determining a decreased transmit power of a remaining transmission of the second set of uplink transmissions based at least in part on a sum of transmit powers of the remaining transmissions satisfying a threshold.

16. The method of claim 15, wherein the power sharing configuration indicates that a transmit power of a remaining transmission of the first set of uplink transmissions is not diminished.

17. The method of claim 15, wherein the threshold relates to a maximum user equipment transmit power.

18. The method of claim 14, wherein the dropped transmission from the first set of uplink transmissions and the dropped transmission from the second set of uplink transmissions are associated with lower priority levels than priority levels associated with remaining transmissions of the first set of uplink transmissions and the second set of uplink transmissions.

19. The method of claim 14, wherein a deadline for scheduling a transmission on the one or more MCGs is determined based at least in part on a start of a remaining transmission of the second set of uplink transmissions.

20. The method of claim 13, wherein determining the power sharing configuration further comprises decreasing respective transmit powers of the second set of uplink transmissions based at least in part on a sum of transmit powers of overlapped transmissions, of the first set of uplink transmissions and the second set of uplink transmissions, satisfying a threshold.

21. The method of claim 13, further comprising determining that a lower-priority group of transmissions, of the first set of uplink transmissions and the second set of uplink transmissions, is dropped, wherein the lower-priority group of transmissions includes a transmission of the first set of uplink transmissions and a transmission of the second set of uplink transmissions.

22. The method of claim 21, wherein the lower-priority group of transmissions are associated with lower priority levels than priority levels associated with remaining transmissions of the first set of uplink transmissions and the second set of uplink transmissions.

23. The method of claim 22, wherein, for a given priority level, a deadline for scheduling a transmission on the one or more MCGs is determined based at least in part on a start of a transmission of the second set of uplink transmissions associated with the given priority level.

24. A user equipment (UE) for wireless communication, comprising:
a memory; and
one or more processors coupled to the memory, the memory including instructions executable by the one or more processors to cause the UE to:
identify one or more overlaps between a first set of uplink transmissions on one or more master cell groups (MCGs) and a second set of uplink transmissions on one or more secondary cell groups (SCGs), wherein the first set of uplink transmissions are associated with respective first priority levels and the second set of uplink transmissions are associated with respective second priority levels;
drop one or more transmissions, of at least one of the first set of uplink transmissions or the second set of uplink transmissions, based at least in part on the respective first priority levels and the respective second priority levels; and
determine a power sharing configuration for one or more remaining transmissions, of the at least one of the first set of uplink transmissions or the second set of uplink transmissions, based at least in part on dropping the one or more transmissions of the at least one of the first set of uplink transmissions or the second set of uplink transmissions.

25. The UE of claim 24, wherein the instructions, when dropping the one or more transmissions, are further executable by the one or more processors to cause the UE to drop a transmission from the first set of uplink transmissions and dropping a transmission from the second set of uplink transmissions.

26. The UE of claim 25, wherein the instructions, when determining the power sharing configuration, are further executable by the one or more processors to cause the UE to determine a decreased transmit power of a remaining transmission of the second set of uplink transmissions based at least in part on a sum of transmit powers of the remaining transmissions of the first set of uplink transmissions and the second set of uplink transmissions satisfying a threshold.

27. The UE of claim 25, wherein the dropped transmission from the first set of uplink transmissions and the dropped transmission from the second set of uplink transmissions are associated with lower priority levels than priority levels associated with remaining transmissions of the first set of uplink transmissions and the second set of uplink transmissions.

28. The UE of claim 24, wherein the instructions, when determining the power sharing configuration, are further executable by the one or more processors to cause the UE to decrease respective transmit powers of the second set of uplink transmissions based at least in part on a sum of transmit powers of overlapped transmissions, of the first set of uplink transmissions and the second set of uplink transmissions, satisfying a threshold.

29. The UE of claim 28, wherein the instructions are further executable by the one or more processors to cause the UE to drop a lower-priority group of transmissions, of the first set of uplink transmissions and the second set of uplink transmissions, wherein the lower-priority group of transmissions includes a transmission of the first set of uplink transmissions and a transmission of the second set of uplink transmissions.

30. A base station for wireless communication, comprising:
a memory; and
one or more processors coupled to the memory, the memory including instructions executable by the one or more processors to cause the base station to:
schedule a first set of uplink transmissions on one or more master cell groups (MCGs) and a second set of uplink transmissions on one or more secondary cell groups (SCGs) with one or more overlaps, wherein the first set of uplink transmissions are associated with respective first priority levels and the second set of uplink transmissions are associated with respective second priority levels;
receive one or more remaining transmissions, of at least one of the first set of uplink transmissions or the second set of uplink transmissions, other than one or more dropped transmissions of the at least one of the first set of uplink transmissions or the second set of uplink transmissions, based at least in part on the respective first priority levels, the respective second priority levels, and a power sharing configuration for the one or more remaining transmissions; and
determine the power sharing configuration for the one or more remaining transmissions based at least in part on the one or more overlaps.

* * * * *